United States Patent

Jäckel et al.

[11] Patent Number: 6,131,487
[45] Date of Patent: Oct. 17, 2000

[54] TORSIONAL VIBRATION DAMPER

[75] Inventors: Johann Jäckel, Baden-Baden; Albert Birk, Bühl-Vimbuch, both of Germany

[73] Assignee: LuK Lamellen und Kupplungsbau GmbH, Buhl, Germany

[21] Appl. No.: 09/110,310

[22] Filed: Jul. 6, 1998

Related U.S. Application Data

[63] Continuation-in-part of application No. 08/469,031, Jun. 6, 1995.

[30] Foreign Application Priority Data

Mar. 2, 1995 [DE] Germany .......................... 195 03 554

[51] Int. Cl.[7] ..................................................... F16F 15/10
[52] U.S. Cl. ............................. 74/574; 74/572; 74/573 R; 192/106.2; 464/68
[58] Field of Search .................. 74/572–574; 192/106.1, 192/106.2; 464/66, 68

[56] References Cited

U.S. PATENT DOCUMENTS

| | | | |
|---|---|---|---|
| 4,747,801 | 5/1988 | Chasseguet et al. | 464/66 |
| 5,032,107 | 7/1991 | Umeyama et al. | 464/68 |
| 5,065,642 | 11/1991 | Kagiyama et al. | 74/574 |
| 5,092,820 | 3/1992 | Naudin et al. | 464/68 |
| 5,307,710 | 5/1994 | Feldhaus et al. | 74/574 |
| 5,355,747 | 10/1994 | Kajitani et al. | 74/573 F |
| 5,377,560 | 1/1995 | Schierling et al. | 74/574 |

*Primary Examiner*—Vinh T. Luong
*Attorney, Agent, or Firm*—Darby & Darby

[57] ABSTRACT

A composite flywheel has primary and secondary masses rotatable relative to each other against the resistance of a damper having arcuate coil springs and an abutment between neighboring end portions of such springs. The abutment can move in the circumferential direction of the masses and is preferably form-lockingly connected against loss to at least one of the springs. To this end, a portion of the abutment extends into the adjacent convolutions of the at least one spring and is engaged by such convolutions with a force which suffices to prevent unintentional separation of the at least one spring from the abutment in the axial direction of the at least one spring.

28 Claims, 3 Drawing Sheets

TORSIONAL VIBRATION DAMPER

CROSS-REFERENCE TO RELATED CASE

This is a continuation in part of commonly owned copending patent application Ser. No. 08/469,031 filed Jun. 6, 1995 for "TORSIONAL VIBRATION DAMPER".

BACKGROUND OF THE INVENTION

The present invention relates to dampers in general, and more particularly to improvements in torsional vibration dampers of the type having at least two structural elements which are rotatable relative to each other about a common axis against the resistance of at least one energy storing device. The structural elements comprise stressing portions which serve to compress the at least one energy storing device when at least one of the structural elements is caused to turn relative to the other structural element or elements. Each energy storing device comprises at least one coil spring, and at least one of the two end portions of the coil spring cooperates with an abutment which is turnable relative to the structural elements and serves as a support for the corresponding end portion of the coil spring.

Published German patent application No. 36 10 127 discloses a torsionally elastic vibration damping clutch which constitutes a twin-mass flywheel wherein torsionally elastic or vibration damping elements are interposed between a primary flywheel mass which can be connected with a prime mover and a secondary flywheel mass which can be connected with a transmission by way of a clutch, the torsionally elastic elements serving to permit angular movements of the two flywheel masses relative to each other. The torsionally elastic elements are constituted by energy storing devices comprising coil springs. Such energy storing devices are compressed, in response to angular movement of the two flywheel masses relative to each other, by stressing portions which are provided on the flywheel masses. Cover plates can be provided between the stressing portions and the coil springs to serve as supports for the respective coil springs. The aforementioned German patent application further proposes to employ, in a so-called twin-mass flywheel, long energy storing devices which are assembled of springs disposed in a chamber one after the other to operate in series. Wedge-like intermediate pieces are provided between the springs which are inserted into a chamber. This publication does not disclose any further details of the intermediate pieces.

Published German patent applications Nos. 37 21 711 and 37 21 712 disclose spring cups or supporting pieces for the end portions of long springs. The spring cups are provided with projections which are designed in such a way that, in the event of leaving the interior of the end portion of the corresponding spring, the projections can reenter the respective end portion. Such spring cups can be put to use only in substantially circumferentially complete sockets having diameters conforming to the outer diameters of the springs. However, when utilized in conjunction with spring-receiving chambers which do not conform to the outer diameters of the springs and/or which are not substantially complete in the circumferential direction, such spring cups are apt to change their angular positions and to jam to an extent such that they cannot be reintroduced into the corresponding springs; this interferes with the operation of the damper or of the twin-mass flywheel. In fact, this can even result in destruction of the spring cups and/or of the springs. The aforementioned published German patent application No. 37 21 112 corresponds to U.S. Pat. No. 5,487,704.

U.S. Pat. No. 5,218,884 (granted Jan. 15, 1993 to Röhrle for "TORSION DAMPER ESPECIALLY FOR MOTOR VEHICLES") discloses two masses which are rotatable relative to each other against the opposition of resilient elements in the form of arcuate coil springs. FIGS. 4 and 5 of this patent show so-called intermediate pieces which have centering spigots insertable into the adjacent end convolutions of two neighboring coil springs, and centrally located collars serving as abutments for the end convolutions of such springs. The patent does not suggest to connect the intermediate pieces to the adjacent coil springs in such a way that the springs hold the respective intermediate pieces against loss or vice versa.

The disclosures of all patents and patent applications which are mentioned in this specification are incorporated herein by reference.

OBJECTS OF THE INVENTION

An object of the present invention is to provide spring cups or spring abutments which render it possible to establish satisfactory supports for the end portions of the springs which cooperate therewith and to establish such satisfactory supports under all anticipated operational conditions, and this under a wide variety of circumstances of use and in connection with a wide variety of designs of torsional vibration dampers.

Another object of the invention is to provide a simple assembly as well as to facilitate the making of torsional vibration dampers at a reasonable cost.

A further object of the invention is to provide a torsional vibration damper which renders it possible to achieve a large number of possible variations, or a large number of possible conformances to a particular use, of the characteristic curve of the torque or the characteristic curve of the resistance to rotation of a plurality of structural elements relative to each other, such torque or resistance to rotation being generated by the energy storing devices, such as coil springs, which oppose rotation of the plurality of structural elements relative to each other.

An additional object of the invention is to ensure that one can realize very soft characteristic curves denoting the resistance to rotation, namely curves which exhibit a low ratio, and/or multistage characteristic curves denoting a resistance to rotation of the structural elements relative to each other.

Still another object of the invention is to provide novel and improved means for separating neighboring arcuate coil springs from each other.

A further object of the invention is to provide novel and improved combinations of coil springs and abutments for coil springs which can be utilized with advantage in torsional vibration dampers, e.g., in the power trains of motor vehicles.

Another object of the invention is to provide a torsional vibration damper with novel and improved means for reliably but separably coupling its energy storing elements to each other.

An additional object of the invention is to provide a novel and improved method of preventing unintentional separation of coil springs from abutments which are combined with such coil springs in torsional vibration dampers for use in the power trains of motor vehicles.

Still another object of the invention is to provide a novel and improved torsional vibration damper wherein the springs and/or other parts are reliably connected to each other in a simple, efficient and inexpensive manner.

A further object of the invention is to provide a novel and improved system of energy storing means for use in a torsional vibration damper between two or more masses which are rotatable relative to each other about a common axis and can be put to use with particular advantage in the power trains of motor vehicles, e.g., to transmit torque from the output element of a prime mover (such as an internal combustion engine) to a clutch, to a transmission or any other torque receiving part or group of parts.

OBJECTS OF THE INVENTION

In accordance with the invention, at least some of the above-enumerated objects are accomplished in that the novel spring abutment, i.e., the novel intermediate piece, is connected against loss with the adjacent end portion of at least one spring. In this manner, one can ensure that the spring abutment invariably remains in an optimum position for the stressing of the spring or springs. For proper positioning and/or securing, the spring abutment can be provided with at least one shaped portion which overlaps or crosses the neighboring end portion of the at least one spring, as seen in the direction of the longitudinal axis of the spring. It is of advantage to impart to the shaped portion the configuration of a projection or stud on the spring abutment, i.e., on the intermediate piece, and such projection or stud extends into a space which is defined or surrounded by the corresponding convolutions of the spring. In order to secure it to at least one spring, an abutment or its shaped portion can be provided with one or more configurations or portions which surround at least one end convolution or the end portion of a spring to thus secure the abutment to such spring.

The novel securing of spring abutments or suporting parts for the coil springs of torsional vibration dampers can be put to use in a particularly advantageous manner when one employs energy storing devices consisting of several coil springs which operate in series and are disposed practically immediately behind each other. Such spring abutments or supporting parts can be installed with advantage between confronting end portions or end convolutions of springs which operate in series. In this manner, one ensures the establishment of a satisfactory support between the series-connected springs and, if necessary, it is further possible to dispose—in at least one of the series-connected coil springs—an inner coil spring which can also be acted upon by the at least one abutment which acts as an intermediate supporting part.

More specifically, one feature of the present invention resides in the provision of a torsional vibration damping apparatus which comprises a plurality of structural elements which are rotatable relative to each other about a common axis, and at least one energy storing device which is arranged to oppose rotation of the structural elements relative to each other and is compressible by stressing means provided on the structural elements. The at least one energy storing device includes at least one coil spring having a longitudinal axis and first and second end portions, and the improved apparatus further comprises at least one abutment which is adjacent one of the two end portions of the at least one coil spring, which is movable relative to the structural elements about the common axis, and which includes a portion engaged by an end convolution of one of the two end portions of the at least one coil spring. Still further, the improved apparatus comprises means for connecting the abutment to the one end portion of the at least one coil spring against loss, and such connecting means includes means for holding the one end portion of the at least one coil spring and the abutment against movement away from each other in the direction of the longitudinal axis of the at least one coil spring.

The aforementioned portion of the at least one abutment can overlap the one end portion of the at least one spring (as seen in the direction of the longitudinal axis of the at least one coil spring).

The connecting means can include a form-locking connection, and such form-locking connection can be provided between the at least one abutment and at least one end convolution of the one end portion of the at least one coil spring. The form-locking connection can constitute a snap-type connection.

The connecting means can be provided between the aforementioned portion of the at least one abutment and the one end portion of the at least one coil spring.

The at least one coil spring can have a plurality of convolutions including the aforementioned end convolution, and the aforementioned portion of the at least one abutment can resemble or constitute a ring. Such abutment can further comprise at least one projection extending from the ring-shaped portion into an internal space which is surrounded by the one end portion of the at least one coil spring. The connecting means can be provided between the at least one projection and at least a portion of at least one of the plurality of convolutions.

The end convolution of the at least one coil spring can include a free end portion which forms part or can form part of the connecting means.

The connecting means can be provided with a substantially radial recess which is or which can be formed in the at least one abutment for a portion of one of the plurality of convolutions of the at least one coil spring; such portion of the one convolution can be form-lockingly received in the recess. The recess can be provided in the at least one abutment adjacent the aforementioned portion of the abutment, and such recess can receive the free end portion of the end convolution of the at least one coil spring. Such free end portion then forms part of the connecting means and preferably extends at least substantially radially into the recess.

The additional convolutions of the at least one coil spring (namely the convolutions forming part of the aforementioned plurality of convolutions and being provided in addition to the end convolution) are preferably formed in such a way that they have first helix angles in the uncompressed condition of the at least one coil spring. The end convolution has a second helix angle which at least approximates the first helix angle in the uncompressed condition of the at least one coil spring.

The aforementioned portion of the at least one abutment can be provided with a supporting surface for the one end portion of the at least one coil spring, and the free end portion of the end convolution of such coil spring is preferably adjacent and at least substantially parallel to the supporting surface in the uncompressed condition of the at least one coil spring.

The free end portion of the end convolution of the at least one coil spring can be adjacent the aforementioned portion of the a least one abutment and can extend at least substantially radially inwardly toward the longitudinal axis of the at least one coil spring beyond the additional convolutions of the aforementioned plurality of convolutions.

The at least one energy storing device can further comprise an inner spring which is confined in the at least one coil spring.

Alternatively, the at least one energy storing device can further comprise a second spring which surrounds the at least one coil spring.

If the at least one energy storing device further comprises a second spring, the torsional vibration damper can further comprise means for connecting the at least one abutment against loss with the second spring; this is often desirable, especially if the second spring is confined in the at least one coil spring.

The at least one energy storing device can further comprise a second coil spring in series with the at least one coil spring between the stressing means. An end portion of the second coil spring can be positioned adjacent the one end portion of the at least one coil spring and the at least one abutment is then disposed between the one end portion of the at least one coil spring and the end portion of the second coil spring. The at least one energy storing device can further comprise a third spring which is confined in one of the coil springs flanking the at least one abutment; the length of the third spring can match the length of the coil spring which receives or confines the third spring.

If the at least one energy storing device comprises an inner spring which is confined in the at least one coil spring, the length of the inner spring is or can be less than the length of the at least one coil spring; alternatively, the length of the inner spring can match or approximate the length of the at least one coil spring.

If the at least one energy storing device further comprises a second spring which is in series with the at least one coil spring, the stressing means can be disposed between such springs. An end portion of the second spring which is remote from the stressing means is preferably positioned to confront the one end portion of the at least one coil spring, and the at least one abutment can be disposed between the one end portion of the at least one coil spring and the end portion of the second spring.

Irrespective of whether the at least one energy storing device comprises one or more coil springs, the single coil spring or at least one of two or more coil springs can have a precurved shape.

Each convolution of the at least one coil spring can have a diameter which is a fraction, particularly a small fraction, of the axial length of such coil spring.

As a rule, the number of energy storing devices in a torsional vibration damper which embodies the present invention need not exceed three.

The structural elements can be mounted in such a way that they are rotatable relative to each other from a neutral position through angles of at least 30° in clockwise and counterclockwise directions.

At least one of the structural elements can form part of or can constitute a flywheel.

An additional feature of the invention resides in the provision of a torsional vibration damping apparatus which comprises two structural elements rotatable relative to each other about a common axis, at least one energy storing device which is arranged to oppose rotation of the structural elements relative to each other and comprises at least two springs which operate in series, which have longitudinal axes, and which include first end portions adjacent stressing means provided on the structural elements and second end portions, an abutment disposed between the second end portions of the at least two springs, and means for connecting the abutment to at least one of the two second end portions against loss. The connecting means includes means for holding the at least one second end portion and the abutment against movement away from each other in the direction of the respective longitudinal axis.

The novel features which are considered as characteristic of the invention are set forth in particular in the appended claims. The improved torsional vibration damping apparatus itself, however, both as to its construction and the mode of assembling and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
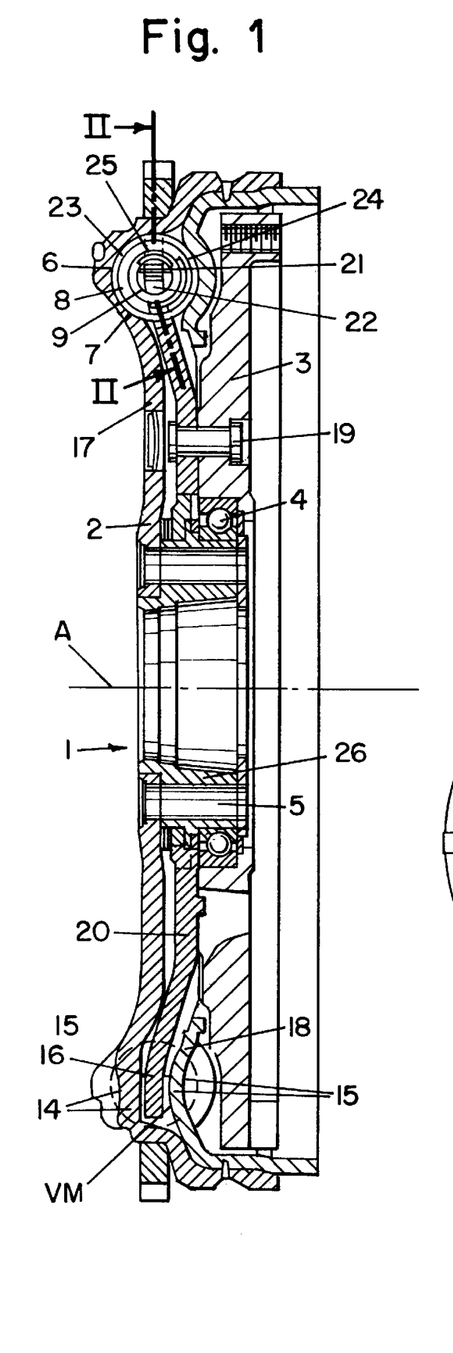
FIG. 1 is an axial sectional view of a torsional vibration damping apparatus which embodies one form of the invention.
Figure 2:
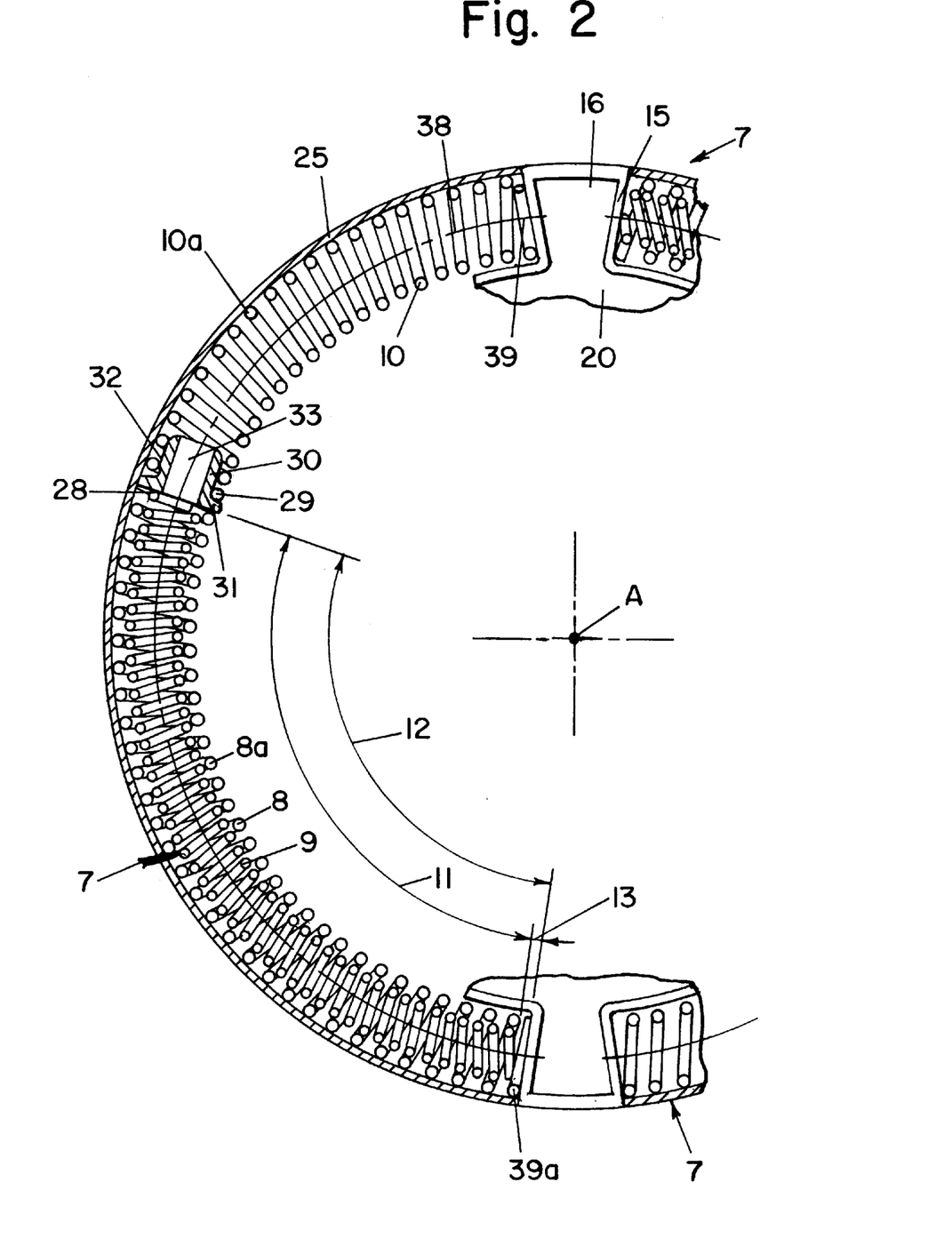
FIG. 2 is a fragmentary sectional view substantially as seen in the direction of arrows from the line II—II in FIG. 1.

The torsional vibration damping apparatus of FIGS. 1 and 2 comprises a split flywheel 1 which includes a first or primary flywheel mass or structural element 2 adapted to be affixed to a non-illustrated output shaft of a combustion engine, as well as a second or secondary flywheel mass or structural element 3. The second flywheel mass 3 can be connected, with the interposition of a clutch disc, to a friction clutch which can couple the output shaft with or can disengage the output shaft from an input shaft (not shown) of a transmission. The flywheel masses 2 and 3 are mounted for rotation relative to each other about a common axis A on an antifriction ball bearing 4 which, in the embodiment of FIGS. 1 and 2, is disposed radially outwardly of axially parallel bores 5 for the introduction of fastening screws serving to mount the first flywheel mass 2 on the output shaft of a combustion engine.

A damping arrangement 6 which operates between the two flywheel masses 2 and 3 comprises energy storing devices 7 at least one of which is constituted by compression coil springs 8, 9 and 10. As best shown in FIG. 2, the coil spring 9 is received in the space defined by the convolutions 8a of the spring 8 or, otherwise stated, the coil springs 8 and 9 are interfitted into one another as seen in their longitudinal direction. In the embodiment of FIGS. 1 and 2, the length 11 of the inner coil spring 9, as seen in the circumferential direction of the flywheel masses 2 and 3, is less than the length 12 of the outer coil spring 8. It can be of advantage if the inner spring 9 is shorter than the outer spring 8 by a value 13 having a magnitude in the range of between one and five angular degrees. However, the length differential or angular differential 13 can also be larger. Furthermore, the springs 8, 9 can have identical lengths, i.e., they can extend along identical angles. The springs 8 and 9 operate in parallel and are installed to operate in series with the coil spring 10. Even though the embodiment which is shown in FIGS. 1 and 2 does not provide a further spring within the coil spring 10, the provision of such inner spring within the spring 10 can be of advantage for many applications. Such inner spring is then received in the spring 10 in a manner similar to that in which the inner spring 9 is installed in the outer spring 8. Furthermore, it can be of advantage for many applications if one provides only the outer spring 8, i.e., if the inner spring 9 is omitted.

The two flywheel masses 2 and 3 comprise stressing means or portions 14, 15 and 16 for the energy storing devices 7. In the embodiment of FIGS. 1 and 2, the stressing portions 14, 15 are embossed portions of sheet metal parts 17, 18 which, in turn, form part of the flywheel mass 2. Additional stressing portions 16, which are disposed between the stressing portions 14 and 15, are defined by at least one flange-like stressing component 20 which is connected to the secondary flywheel mass 3, for example, by rivets 19. This stressing component 20 transmits torque between the energy storing devices 7 and the flywheel mass 3. The additional stressing portions 16 are constituted by radial arms or beams which are provided at the periphery of the flange-like stressing component 20. The component 20 can be produced as a result of cold forming of metallic sheet material and serves to secure the first flywheel mass 2, i.e., the entire split flywheel 1, to the output shaft of a combustion engine. The radially outer portion of the sheet metal part 17 is connected with the part 18 which also consists of a metallic sheet material.

The parts 17, 18 define a ring-shaped space 21 which comprises a toroidal portion 22. The ring-shaped space 21, or at least the toroidal portion 22, is at least partially filled with a viscous medium VM, such as for example grease. As seen in the circumferential direction between the stressing portions or shoulders 14, 15, the parts 17, 18 define recesses which bound the toroidal portion 22 and receive the energy storing devices 7 to guide them not only in the radial but also in the axial direction. At least when the composite flywheel 1 rotates, the convolutions of the springs 8 and 10 abut those portions of the part 17 and/or 18 which are located radially outwardly of the toroidal portion 22. In the embodiment of FIGS. 1 and 2, there is provided a wear protector 25 which constitutes a hardened intermediate layer of sheet metal or a sheet metal layer which serves as a radial abutment for the springs 8 and 10. The wear protector 25 preferably extends in the circumferential direction at least along the full length or angular distance of the energy storing devices 7 when such devices are in an unstressed condition. Due to the abutment of the convolutions of the springs 8 and 10 in dependency on the magnitude of the centrifugal force, there develops between such convolutions and the parts which are in frictional contact therewith a frictional damping action which is a function of the RPM and which arises as a result of a change of the length or compression of the energy storing devices 7 and more specifically of the springs 8 and 10.

The radially inner portion of the radially extending part 17 carries an intermediate portion or hub 26 which confines or carries the inner race of the bearing 4. The outer race of the bearing 4 is carried by the flywheel mass 3.

As can be best seen in FIG. 2, the angular dimensions of the stressing portions 16 are smaller than those of the stressing portions 14, 15 so that, starting from the theoretical initial position of rest or starting or neutral position, the flywheel masses 2 and 3 have freedom of relatively small angular movement relative to each other in both directions without any stressing of the springs. For example, the flywheel masses can rotate relative to each other from the neutral position through angles of at least 30° in clockwise and counterclockwise directions (see FIG. 10).

Figures 3, 4, 5, 6, 7:
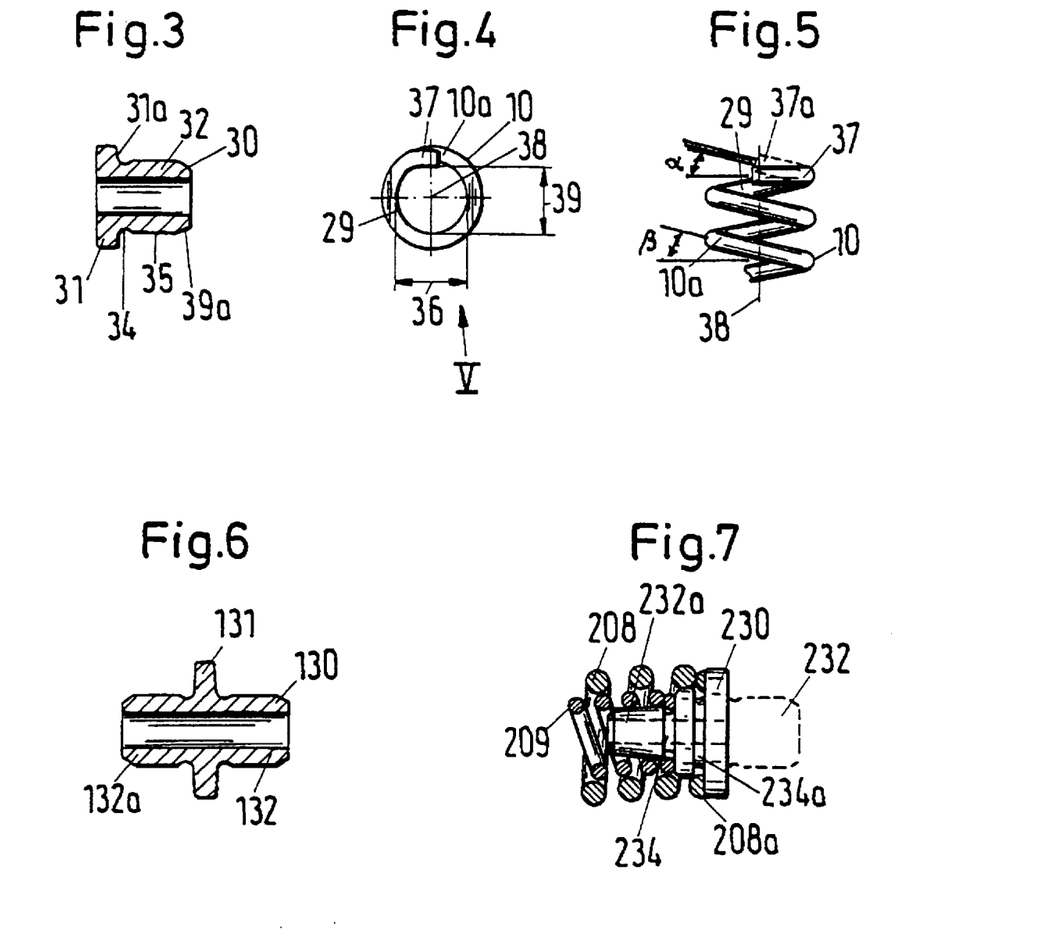
FIG. 3 is an axial sectional view of an abutment which can be utilized in the apparatus of FIGS. 1 and 2.
FIG. 4 shows that end of a coil spring which cooperates with the abutment of FIG. 3.
FIG. 5 is a side elevational view of the coil spring as seen in the direction of arrow V in FIG. 4.
FIG. 6 is an axial sectional view of a modified abutment.
FIG. 7 is a side elevational view of a third abutment and a fragmentary axial sectional view of two coil springs which are coupled to the abutment in accordance with our invention.

FIG. 2 further shows that an intermediate piece 30 or abutment is provided between the confronting or neighboring end convolutions 27, 28 of the springs 8, 9 on the one hand, and the end convolution 29 of the spring 10 on the other hand, and such intermediate piece or abutment can be said to constitute a spring seat which serves to support the end convolutions or end portions 27, 28, 29 of the springs 8, 9 and 10. In the embodiment of FIGS. 1 and 2, and as best shown in FIG. 3, the intermediate piece or abutment 30 comprises a ring-shaped portion 31 against which the springs 8, 9 and 10 abut in the circumferential direction of the split flywheel 1, as well as a projection or stud 32 which extends at right angles to the ring-shaped portion 31 and into the space which is surrounded by the convolutions 10a, namely into one end portion of the spring 10. In this embodiment, the abutment 30 is hollow in that it is provided with an axially extending channel 33. As can be seen in FIG. 2, each energy storing device 7 (i.e., the coil springs 8, 9 and 10 which constitute the respective energy storing device) has end portions which confront the stressing portions 14, 15, 16 and are not provided with any supporting parts or spring sockets. However, it is possible to provide a supporting part or a spring socket at least at one end of each energy storing device 7.

The abutment 30 is connected with the compression coil spring 10 against loss. To this end, there is provided between the abutment 30 and the spring 10 a form-locking connection which, in the embodiment of FIGS. 1 and 2 (and as will be described in greater detail with reference to FIGS. 3 and 4), constitutes a snap-type connection.

As can be seen in FIG. 3, the spring abutment or supporting part 30 is provided with a recess established by a ring-shaped groove 34 which is provided in the axially extending projection 32 immediately adjacent the ring-shaped portion 31. The outer diameter 35 of the projection 32 corresponds at least substantially to the inner diameters 36 of the convolutions 10a of the spring 10 (see FIG. 4). The outer diameter 35 is preferably slightly smaller than that portion of the inner diameter 36 which is adjacent the region of the spring end portion confronting the abutment 30.

As can be seen in FIG. 4, the free end portion 37 of the end convolution 29 which is adjacent the abutment 30 is displaced, namely bent, radially toward the longitudinal axis 38 of the spring, relative to the other portions of the end convolution 29 of the spring 10 and hence also relative to the convolutions 10a. In this manner, one arrives at a reduced width 39 which is less than the inner diameter 36 of the end convolution 29 and of the convolutions 10a, namely less than the outer diameter 35 of the projection 32. During assembly of the spring 10 with the abutment 30, the projection 32 is pushed into the respective end portion of the spring 10 which, at first, results in a widening of the end convolution 29 so that the distance 39 is increased. Thus, the end portion 37 is pushed radially outwardly. The end portion 37 and that part of the abutment 30 which defines the groove 34 can be said to constitute a means for connecting the abutment 30 to one end portion of the spring 10 against loss and against any, or any appreciable, movement of the projection 32 and the end portion of the spring 10 away from each other in the direction of the longitudinal axis 38 of such spring.

As soon as the free end portion or end section 37 of the convolution 29 reaches the level of the groove 34, the end convolution 29 is free to resile back to its original position so that the distance 39 is then reduced again whereby the end portion 37 moves or snaps radially inwardly into the groove 34 to thus hold the supporting part or abutment 30 against loss relative to the spring 10. The free end of the projection 32 is provided with a narrowing or taper 39a which facilitates the pushing or pressing of such projection 32 into the confronting end portion of the spring 10. The taper 39a can forcibly shift the end portion 37 radially outwardly.

As can be seen by referring to FIG. 5, save for the end portion 37 which extends radially into the groove 34, the slope or helix angle α of the end convolution 29 is the same as that (β) of the plurality of convolutions 10a which are disposed between the end convolutions of the spring 10. At least when the spring 10 is in an unstressed condition, the end portion 37 of this spring extends in parallelism with the supporting surface 31a (FIG. 3) of the ring-shaped portion 31, i.e., of the abutment 30. To this end, and as can be seen in FIG. 5, the end portion 37 is bent in the direction of the longitudinal axis 38 of the spring 10 from a position 37a which is shown by broken lines to that position of the end portion 37 which is shown by solid lines.

The end convolution at that end of the spring 10 which is adjacent the stressing portions 14, 15, 16 is ground and abuts, as a result of deformation in the direction of the spring axis 38, the adjacent next-to-the-last convolution so that it presents—in a manner known per se—an abutment surface extending at least substantially at right angles to the spring axis 38. Such design of the end convolution is proposed, for example, in published German patent application No. 42 29 416. Both end portions of each of the coil springs 8 and 9 are also provided with similarly flattened end convolutions so that one can ensure a satisfactory stressing of such springs by the stressing portions 14, 15, 16 as well as satisfactory propping of these springs at the ring-shaped portion 31 of the abutment 30.

The spring rates or spring stiffnesses of the coil springs 8 and 10 can be identical or different. Furthermore, the ratio of the length of the spring 8 or 9 to that of the spring 10 is preferably selected in dependency upon the intended use; such length ratio can be in the range of between 0.5:1 and 3:1, preferably in the range of between 1:1 and 2:1.

The utilization of the abutment 30 exhibits the following advantages:

(1) It is possible to connect in series springs with a large ratio of spring length to spring diameter but to invariably ensure, nevertheless, that the confronting end portions of these springs are properly acted upon, and also to prevent a slipping out or separation of the supporting part 30 from the corresponding spring. Thus, the abutment 30 is invariably stressed in an optimum manner and cannot be destroyed by the springs 8, 10 as a result of tilting relative to the respective end portions of such springs.

(2) If one employs at least one inner spring 9, the latter can be shorter because, for the purposes of its compression, such spring need not reach even a portion of the overall length of the spring 10.

(3) The abutment 30 renders it possible to employ inner springs having different lengths and/or stiffnesses. It is even possible to provide at least one inner spring in the interior of the spring 10, and such inner spring can have the same length as, or can be shorter than, the spring 10.

Furthermore, it can also be of advantage for numerous applications if, as shown in FIG. 6, the intermediate piece or abutment 130 comprises a ring-shaped supporting portion 131 from which a projection 132, 132a extends in each of the two axial directions, i.e., in both circumferential directions of the torsional vibration damping apparatus. Owing to such design of the abutment 130, not only the spring 10 can establish a very strong and highly reliable connection with the abutment—as seen in the direction of the longitudinal axis 38 (FIG. 5) of such spring—but also the spring 9 so that the springs 8 and 10 are reliably coupled to each other as seen in the circumferential direction of the torsional vibration damping apparatus. Due to such design of the abutment 130, and when compared with the embodiment which is shown in FIG. 3, the length of the inner spring 9 must be reduced at least by the length or axial extension of the projection 132 or 132a.

The projection 132 which is shown in FIG. 6 can be configurated in such a way that it also conforms to the inner spring 9 so that, in such instance, at least the spring 9 is connected with the spring 10.

Still further, and as shown in FIG. 7, the abutment 230 can be designed in such a way that it comprises a stepped projection 232a and that each of its steps is provided with a shaped portion or groove 234, 234a to thus permit entry of at least certain portions of the respective end convolutions of the springs 208, 209. Owing to such design, one additionally achieves that the inner spring 209 is practically incapable of sliding relative to the outer spring 208 or that the inner spring 209 cannot slide out of the outer spring 208. As indicated in FIG. 7 by broken lines, the abutment 230 can also be provided with a projection 232 for a spring 10 of the type shown in FIG. 2, and such projection is connected with the spring 10 against loss. If one employs an inner spring within the spring 10, the projection 232 can also be designed to resemble the projection 232a so that the second inner spring is then also connected with the abutment 230.

Figure 8:
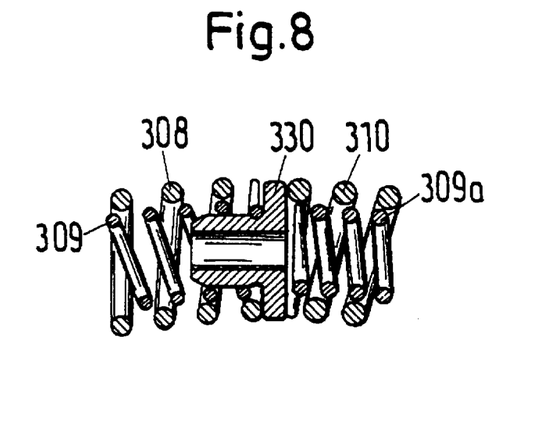
FIG. 8 is an axial sectional view of an abutment which is similar to the abutment of FIG. 3 and cooperates with two pairs of coil springs.

In the embodiment which is illustrated in FIG. 8, and wherein two outer springs 308, 310 are connected in series with an abutment 330 between them, and wherein inner springs 309, 309a are provided in the respective springs 308, 310, the abutment 330 is merely hooked into the inner spring 309, i.e., it is connected with the inner spring 309 against loss.

It will be seen that one can resort to a large number of variations regarding the attachment or fixing of an abutment 30, 130, 230 or 330 to the springs which are adjacent such abutment, the abutment being connected with at least one of such springs against loss. However, the corresponding abutment can also establish a connection with several springs or even with all of the springs which are adjacent thereto.

Figure 9:
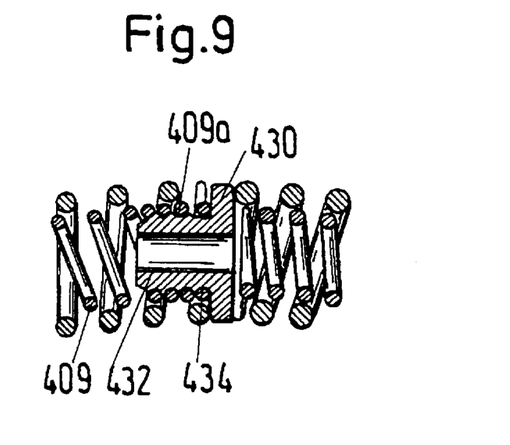
FIG. 9 is a view similar to that of FIG. 8 but showing a modified abutment.

In the embodiment of FIG. 9, a spring abutment 430 which is connected with a spring 409 includes a projection 432 with a threaded profile 434 at its external surface. The end convolutions 409a of the spring 409 are wound in such a way that they can be screwed onto the thread-like profile or connecting means 434. It is preferred to select the inner diameters of the end convolutions 409a in such a way that they can engage the projection 432 in a radially stressed condition to thus avoid unintentional (i.e., accidental) unwinding of the abutment 430 from the adjacent end portion of the spring 409.

Figure 10:
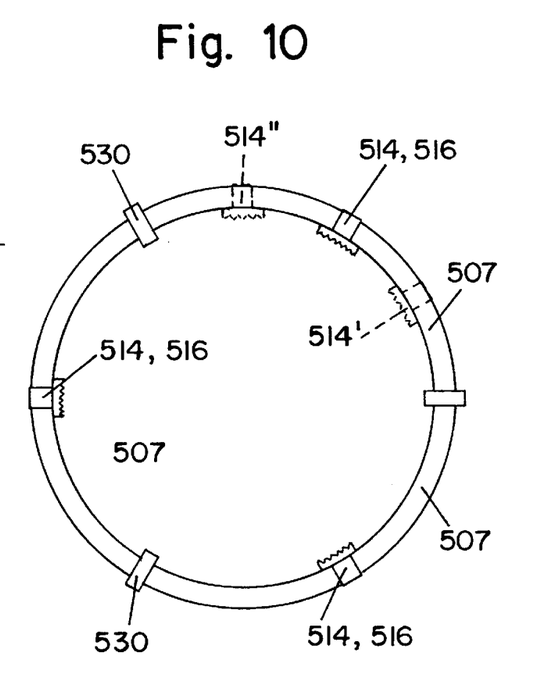
FIG. 10 is a schematic elevational view of a further combination of abutments and coil springs which are coupled to each other in accordance with the present invention.

The torsional vibration damping apparatus which is shown in FIGS. 1 and 2 comprises only two series connected springs. However, it is also possible to connect three or more springs or sets of springs in series, and a discrete novel abutment can be provided between each pair of confronting ends of springs or spring sets. FIG. 10 shows three energy storing devices 507 together forming an annulus spacedly surrounding the common axis of the flywheel masses (not shown) and three discrete abutments 530, one between two coil springs of each energy storing device 507. Each of the abutments 530 can be identical with or can resemble an abutment 30, 330 or 430. Two stressing portions 514, 516 (corresponding to the stressing portions 14, 16 shown in FIG. 1) are installed between each pair of neighboring energy storing devices 507. The positions of one of the stressing portions 514 are shown by broken lines (as at 514', 514") upon angular displacement of about 30° of the two flywheel masses from their neutral positions in clockwise and counterclockwise directions, respectively.

The abutments, each of which is connected, in accordance with the invention, against loss to at least one spring end, can also be provided at those end portions of the corresponding springs which confront the stressing portions 14, 15, 16. For example, and referring to FIG. 2, the springs 8 and 10 could be of one piece, i.e., they could constitute a single spring and the abutment 30 could be provided at the end portion 39 of the spring 10. If the springs 8 and 10 were of one piece, it would also be possible to provide an abutment of the type shown in FIG. 7, 8 or 9 also at the end portion of the spring 8. If the springs 8 and 10 are of one piece. i.e., in the event of the provision of a continuous outer spring between the stressing portions 14, 15, 16 cooperating with such spring, the spring abutment 30 of the type shown in FIG. 2 can be dispensed with.

As seen in the longitudinal direction of a selected coil spring, the at least one end convolution of such coil spring which is anchored in a spring abutment can also be caused to undergo deformation in the direction of the longitudinal axis 38 (FIGS. 2 or 5) of the spring so that it is ground and thus enabled to abut against the next-to-the-last convolution. In this respect, reference was already had to the published German patent application No. 42 29 416. The inner diameter of the thus designed end convolution is preferably smaller than that of the other convolutions so that it can snap into a groove of the corresponding abutment. Such configuration of a spring convolution 208a is shown in FIG. 7. This design of the end portion of a spring renders it possible to ensure that, when the spring is compressed, the area of contact between the spring and the abutment is larger with the result that the force which is generated as a result of compression can be divided along a larger supporting surface of the abutment.

As already mentioned above, the novel construction exhibits the advantage that the abutments cannot slide out of the adjoining end portion or portions of the spring or springs so that one can invariably ensure a reliable stressing of the springs and a reliable mutual support of springs which are arranged in series. Such slipping out or sliding out of abutments or analogous supporting parts can develop particularly when one employs long springs having relatively large radii of curvature and relatively small spring gradients because, and as described, for example, in published German patent applications Nos. 37 21 711 and 37 21 712, the magnitude of centrifugal force acting upon the springs when the apparatus rotates can reach a value at which, following a compression of the springs (e.g., as a result of an abrupt rise of the load), pronounced friction between the convolutions of the springs on the one hand and the supporting regions therefor on the other hand does not permit the springs to fully dissipate the stored energy so that their length is less than that when the springs are completely unstressed. In the absence of the novel securing of the abutments, they can fall out or slip out of the end portion or end portions of the corresponding spring or springs to thereupon change their orientation, e.g., by turning or twisting, in the chamber 21 or in the toroidal space 22. During a renewed compression or stressing of the corresponding springs, one can no longer invariably ensure that the projection or projections of the abutments can find their way into the the adjacent end portion of a coil spring or into the respective spring ends; this can bring about a destruction of the abutment or abutments and/or other damage to the torsional vibration damping apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our aforedescribed contribution to the art of torsional vibration dampers and, therefore, such adaptations, should and are intended to be comprehended within the meaning and range of equivalence of the appended claims.

What is claimed is:

1. Torsional vibration damping apparatus comprising a plurality of structural elements rotatable relative to each other about a common axis; at least one energy storing device arranged to oppose rotation of said structural elements relative to each other and being compressible by stressing means provided on said structural elements, said at least one energy storing device including at least one coil spring having a longitudinal axis and first and second end portions; at least one abutment adjacent one of said end portions and being movable relative to said structural elements about said axis, said abutment including a portion engaged by an end convolution of one of said end portions; and means for connecting said abutment to said one end portion against loss, said connecting means including means for holding said one end portion and said abutment against movement away from each other in the direction of said longitudinal axis.

2. The apparatus of claim 1, wherein said at least one abutment further comprises a part which overlaps the one end portion of said portion of said at least one spring as seen in the direction of said longitudinal axis.

3. The apparatus of claim 1, wherein said connecting means includes a form-locking connection.

4. The apparatus of claim 3, wherein said form-locking connection is provided between said abutment and at least said end convolution of said one end portion.

5. The apparatus of claim 3, wherein said form-locking connection is a snap-type connection.

6. The apparatus of claim 1, wherein said connecting means is provided between said portion of said at least one abutment and said one end portion of said at least one coil spring.

7. The apparatus of claim 1, wherein said at least one coil spring has a plurality of convolutions including said end convolution and said portion of said at least one abutment is substantially ring-shaped, said at least one abutment further comprising at least one projection extending from said ring-shaped portion into an internal space surrounded by said one end portion of said at least one coil spring, said connecting means being provided between said at least one projection and at least a portion of at least one of said plurality of convolutions.

8. The apparatus of claim 1, wherein said end convolution includes a free end portion forming part of said connecting means.

9. The apparatus of claim 1, wherein said at least one coil spring comprises a plurality of convolutions including said end convolution, said connecting means comprising a substantially radial recess provided in said at least one abutment for a portion of one of said plurality of convolutions, said portion of said one of said plurality of convolutions being form-lockingly received in said recess.

10. The apparatus of claim 1, wherein said at least one abutment has a recess adjacent said portion thereof and forming part of said connecting means, said end convolution having a free end portion also forming part of said connecting means and extending at least substantially radially into said recess.

11. The apparatus of claim 1, wherein said at least one coil spring has a plurality of convolutions including said end convolution and additional convolutions, said additional convolutions having first helix angles in the uncompressed condition of said at least one coil spring and, save for a free end portion thereof, said end convolution having a second helix angle at least approximating said first helix angle in the uncompressed condition of said at least one coil spring.

12. The apparatus of claim 1, wherein said portion of said at least one abutment has a supporting surface for said one end portion of said at least one coil spring, said end convolution having a free end portion adjacent and at least substantially parallel to said supporting surface in an uncompressed condition of said at least one coil spring.

13. The apparatus of claim 1, wherein said at least one coil spring has a plurality of convolutions including said end convolution and a plurality of additional convolutions, said end convolution having a free end portion adjacent said portion of said abutment and forming part of said connecting means and extending at least substantially radially inwardly toward said longitudinal axis beyond said additional convolutions.

14. The apparatus of claim 1, wherein said at least one energy storing device further comprises an inner spring confined in said at least one coil spring.

15. The apparatus of claim 1, wherein said at least one energy storing device further comprises a second spring surrounding said at least one coil spring.

16. The apparatus of claim 1, wherein said at least one energy storing device further comprises a second spring confined in said at least one coil spring, and further comprising means for connecting said at least one abutment against loss with said second spring.

17. The apparatus of claim 1, wherein said at least one energy storing device further comprises a second coil spring in series with said at least one coil spring between said stressing means, said second coil spring having an end portion adjacent the one end portion of said at least one coil spring and said at least one abutment being disposed between the end portion of said at least one coil spring and the end portion of said second coil spring.

18. The apparatus of claim 17, wherein said at least one energy storing device further comprises a third spring confined in one of said coil springs, said third spring having a first length and the coil spring confining said third spring having a second length at least matching said first length.

19. The apparatus of claim 1, wherein said at least one energy storing device further comprises an inner spring confined in said at least one coil spring and having a first length, said at least one coil spring having a second length greater than said first length.

20. The apparatus of claim 1, wherein said at least one energy storing device further comprises an inner spring confined in said at least one coil spring and having a first length, said at least one coil spring having a second length at least approximating said first length.

21. The apparatus of claim 1, wherein said at least one energy storing device further comprises a second spring in series with said at least one coil spring, said stressing means being disposed between said springs and said second spring having an end portion remote from said stressing means and confronting said one end portion of said at least one coil spring, said at least one abutment being disposed between said one end portion of said at least one coil spring and said end portion of said second spring.

22. The apparatus of claim 1, wherein said at least one energy storing device further comprises at least one second coil spring and at least one of said coil springs has a precurved shape.

23. The apparatus of claim 1, wherein said at least one energy storing device has a length in a circumferential direction of said structural elements and said at least one coil spring has a plurality of convolutions including said end convolution, each of said convolutions having an outer diameter which is a small fraction of said length.

24. The apparatus of claim 1, comprising at most three energy storing devices together forming an annulus spacedly surrounding said common axis.

25. The apparatus of claim 1, wherein said structural elements are rotatable relative to each other from a neutral position through angles of at least 30° in clockwise and counterclockwise directions.

26. The apparatus of claim 1, wherein at least one of said structural elements forms part of a flywheel.

27. The apparatus of claim 1, wherein at least one of said structural elements constitutes a flywheel.

28. A torsional vibration damping apparatus comprising two structural elements rotatable relative to each other about a common axis; at least one energy storing device arranged to oppose rotation of said structural elements relative to each other and comprising at least two springs operating in series, said at least two springs having longitudinal axes, first end portions adjacent stressing means provided on said structural elements and second end portions; an abutment disposed between the second end portions of said at least two springs; and means for connecting said abutment to at least one of said second end portions against loss, said connecting means including means for holding said at least one second end portion and said abutment against movement away from each other in the direction of the respective longitudinal axis.

* * * * *